United States Patent [19]

Marshall

[11] Patent Number: 5,447,645
[45] Date of Patent: Sep. 5, 1995

[54] COMPOSITION AND METHOD FOR LUBRICATING AND PRESERVING RUBBER

[75] Inventor: Todd C. Marshall, Palm Beach Gardens, Fla.

[73] Assignee: Green Island Research Inc., Palm Beach Gardens, Fla.

[21] Appl. No.: 243,399

[22] Filed: May 16, 1994

[51] Int. Cl.[6] .......................................... C10M 103/02
[52] U.S. Cl. ................................... 252/29; 252/42.7; 252/49.7; 252/58
[58] Field of Search ..................... 252/29, 49.7, 42.7, 252/58

[56] References Cited

U.S. PATENT DOCUMENTS

| | | | |
|---|---|---|---|
| 2,083,176 | 6/1937 | Willson | 252/29 |
| 2,160,273 | 5/1939 | Loane et al. | 252/42.7 |
| 2,960,469 | 11/1960 | Young | 252/42.7 |
| 3,052,629 | 9/1962 | Morrow et al. | 252/29 |
| 3,102,862 | 9/1963 | Green et al. | 252/58 |
| 3,103,490 | 9/1963 | Green | 252/58 |
| 3,150,091 | 9/1964 | Young et al. | 252/49.7 |
| 3,518,190 | 6/1970 | Groszek | 252/58 X |
| 4,096,079 | 6/1978 | Pardee | 252/58 X |
| 4,894,279 | 1/1990 | Sachdev et al. | 428/216 |

OTHER PUBLICATIONS

Ciba-Geigy Corp., Material Safety Data Sheet, TINUVIN 328 Product (no date).
Acheson Colloids Company, Material Safety Data Sheet, Dag-154 product (no date).
DuPont, Material Safety Data Sheet VYDAX ® porduct, pp. 1, 4, 6.
DuPont Chemicals, Material Safety Data Sheet "TYZOR" ® TBT Tintanate product.

Primary Examiner—Prince Willis, Jr.
Assistant Examiner—Cephia D. Toomer
Attorney, Agent, or Firm—Finnegan, Henderson, Farabow, Garrett & Dunner

[57] ABSTRACT

A composition to lubricate or preserve rubber materials having, by weight, 5-10% graphite, 0.5-10% of a titanate ester and the balance isopropyl alcohol. A rubber material is lubricated or preserved by the steps of applying such a composition to a rubber material and allowing the composition to adhere to the rubber material. The composition may also contain 0.5-5% by weight of a fluorocarbon polymer and/or 0.02-5% by weight of a UV stabilizer. The composition and method are particularly suited for lubricating and/or preserving rubber windshield wiper blades.

26 Claims, 1 Drawing Sheet

COMPOSITION AND METHOD FOR LUBRICATING AND PRESERVING RUBBER

BACKGROUND OF THE INVENTION

1. Field Of The Invention

The present invention relates to a composition and method for lubricating or preserving rubber. The invention particularly relates to lubricating or preserving rubber materials adaptable to contact glass or other smooth surfaces, e.g., the rubber portion of windshield wiper blades.

2. Description Of The Prior Art

Rubber materials are often drawn or swept across smooth wet surfaces to clear, clean, or dry those surfaces. When a rubber material comes into contact with a smooth surface, such as a glass, a metal, or a plastic surface, the friction between the rubber material and the surface often causes noise and chatter reducing the effectiveness of the rubber material to clear, clean, or dry the surface.

Windshield wiper blades are a common example of the use of a natural rubber material to clear and/or dry a smooth surface, a windshield. The squeaking and skipping of a windshield wiper blade results from the friction generated by the motion of the wiper blade over the surface of the windshield. Reducing the friction between the surface of the windshield and the wiper blade would not only improve the effectiveness of the windshield wiper but also reduce or even eliminate annoying squeaking and skipping.

While surface friction can reduce their effectiveness, rubber materials also suffer from degradation due to exposure to light and the environment. Sunlight or ultraviolet (UV) radiation, for example, can cause the rubber material in windshield wiper blades to break down leading to reduced effectiveness and even failure. Protecting rubber materials from this degradation would prolong the life and effectiveness of rubber materials.

SUMMARY OF THE INVENTION

To lubricate or preserve rubber materials in accordance with the present invention, there is provided a composition comprising, by weight, 5–10% graphite, 0.5–10% of a butyl titanate ester, and the balance, isopropyl alcohol. In accordance with the present invention, there is also provided a method for lubricating or preserving a rubber material comprising the steps of applying a composition of the invention to a rubber material and allowing the composition to adhere to the rubber material.

In a preferred embodiment the composition may also contain 0.5–5% by weight of a fluorocarbon polymer, and/or 0.02–5% by weight of a UV absorber. The composition and method of this invention are particularly suited for lubricating and/or preserving rubber windshield wiper blades. Additional features and advantages of this invention are disclosed in the detailed description below or can be learned by practicing the invention.

Both the summary above and the following detailed description exemplify and explain the claimed invention. The accompanying drawings provide a further understanding of the invention and are incorporated in and constitute a part of this specification, illustrating at least one embodiment of the invention. Together with the description, the drawings serve to explain the principles of the invention.

DETAILED DESCRIPTION OF THE INVENTION

Figure 1:
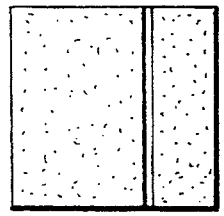
FIGS. 1–4 depict a perspective view, top, side, and front views of an applicator suitable for applying the composition of the invention to a windshield wiper blade.

The present invention provides a composition to lubricate or preserve rubber comprising 5–10% by weight of graphite, 0.5–10% by weight of a butyl titanate ester and the balance isopropyl alcohol. Preferably, the composition comprises 6–8% graphite and 0.7–3% of a butyl titanate ester. More preferably, the composition comprises about 7% of graphite and about 1% of a butyl titanate ester.

In a preferred embodiment, the composition also contains 0.5–5% by weight of a fluorocarbon polymer. Preferably, the fluorocarbon polymer is present in amounts of 1–2.5% by weight and most preferably, about 2%. In another preferred embodiment, the composition contains 0.02–5% by weight of a UV absorber. The UV absorber is preferably present in amounts of 0.05–1.5% by weight and most preferably, about 0.5%.

Any form of graphite dispersible in isopropyl alcohol can be used in the lubricant or preservative composition of this invention. A preferred form of graphite is colloidal graphite. The colloidal graphite may be dispersed in a resin binder as well-known in the art. Colloidal graphite is commercially available as a liquid dispersion in isopropyl alcohol. One such commercially available form of colloidal graphite is the product Dag 154 available from Atchison's Colloids, Port Huron, Michigan. Dag 154 product is a dispersion of colloidal graphite in isopropyl alcohol, contains a cellulosic resin binder and other diluents, and has a solids content of 20%.

A second component of the composition to lubricate or preserve a rubber material is a butyl titanate ester, having the general formula Ti(OR)$_4$ where R is a C$_1$-C$_6$ hydrocarbon group and at least one group R is a butyl, isobutyl or tetrabutyl group. The butyl titanate ester facilitates adhering or curing the composition on the rubber material. When not a butyl, isobutyl or tetrabutyl group, the alkyl group R in the butyl titanate ester may be branched or unbranched, substituted or unsubstituted (e.g., halogenated) and may be the same or different from the other alkyl groups. Exemplary butyl titanate esters include but are not limited to tetrabutyl titanate, tributyl isopropyl titanate or mixtures thereof. The commercial product Tyzor® TBT contains, by weight, 95–99% tetrabutyl titanate, 0–2% 1-butanol, and 1–5% tributyl isopropyl titanate and is a particularly preferred mixture of titanate esters for use in the composition of this invention. Tyzor® product is available from the E.I. duPont de Nemours Corporation, Wilmington, Del.

The isopropyl alcohol used can be any technical or better grade (at least 95%) of isopropyl alcohol. More preferably, the isopropyl alcohol is at least 99% isopropyl alcohol, and most preferably 99% or greater.

To further reduce friction, the composition can preferably contain a fluorocarbon polymer. Fluorocarbon polymers include, but are not limited to, polytetrafluoroethylene, polymers of chlorotrifluoroethylene, fluorinated ethylene-propylene polymers, polyvinylidene fluoride, hexafluoropropylene, etc. When the composition contains a fluorocarbon polymer, a preferred type of polymer is a fluorotelomer such as, for example, omega-hydro-alpha-(methylcyclohexyl)-polytetrafluoroethylene or alpha-chloro-omega-(2,2-dichlorotrifluoroethyl)-polytetrafluoroethylene. Mixtures of the fluorocarbon polymers can also be used. The product, Vydax ® available from E.I. duPont de Nemours Corp., Wilmington, Del., is a preferred mixture of 24-27% omega-hydro-alpha-(methylcyclohexyl)-polytetrafluoroethylene and 3-6% alpha-chloro-omega-(2,2-dichlorotrifluoroethyl)-polytetrafluoroethylene dispersed in isopropyl alcohol, 68-72% by weight.

A UV absorber or a mixture of UV absorbers may also be added to the composition to further enhance its protective properties. Common UV absorbers contemplated for use in compositions according to this invention include, for example, benzophenones, benzotriazoles, substituted acrylonitriles, and phenol-nickel complexes. UV absorbers soluble in isopropyl alcohol are preferred. Benzotriazoles represent a particularly preferred class of UV absorbers. A commercially available substituted benzotriazole is Tinuvin ® 328, a product of Ciba-Geigy Corp., Hawthorne, N.Y., Tinuvin ® 328 has the following general structure:

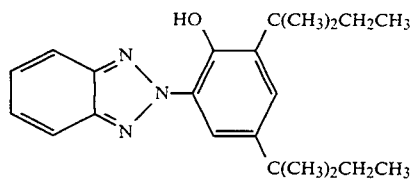

The composition of the invention can be used to lubricate and/or preserve any rubber material, e.g., natural rubber, vulcanized rubber, unvulcanized rubber, synthetic rubber, thermoplastic rubber, or otherwise rubberized materials which are well-known in the art. Natural rubber, perhaps the most commonly used rubber, is used, for example, to make tires, conveyer belt covers, footwear, specialized mechanical products, electric or cable insulation, and windshield wiper blades. Uses for synthetic rubber include tires, steam hoses, and gasoline or oil-loading hoses where high resistance to heat, hydrocarbon oils, etc. is desirable. Thermoplastic rubber is often used in oil-resistant wire and cable insulation.

To lubricate and/or preserve a rubber material, the composition according to the invention is applied to the rubber surface and allowed to adhere to the rubber material. Preferably, the composition is applied as a uniform coating on the rubber surface and allowed to dry. The composition may be applied in a single application or in multiple applications. Preferably, the rubber material to be lubricated or protected is coated at least two times with the composition. Where the composition is being applied to an edge of a rubber material, the composition is preferably applied to the edge itself and any adjacent sides.

Figure 2:
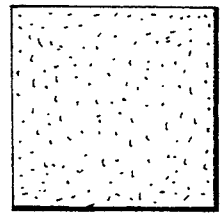
Figure 3:
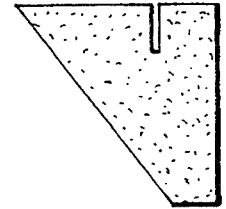
Figure 4:
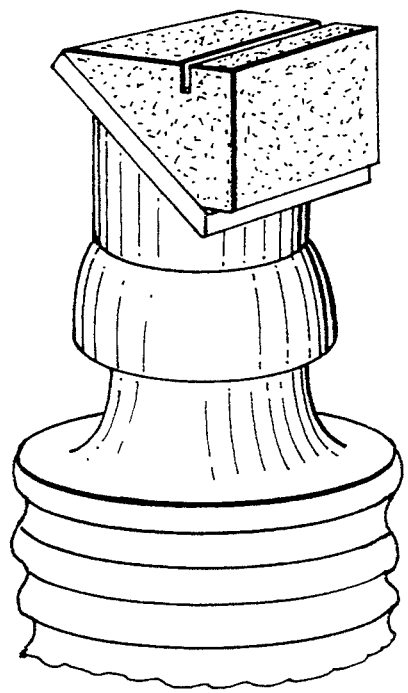

For example, in one embodiment, the composition of the invention is used to lubricate and preserve windshield wiper blades. Both sides of the wiper blade and the tip edge of the blade are uniformly coated with the composition. Preferably, the composition can be applied using a foam pad which has been previously wetted with the composition. More preferably, the foam pad can have a slot cut in the pad to fit around or conform to the geometrical configuration of the windshield wiper blade to further assist coating the windshield wiper blade. FIGS. 1-4 depict a preferred foam pad applicator for windshield wipers. To coat a windshield wiper blade using the foam pad applicator of FIGS. 1-4, one holds the bottle containing the composition upside down (preferably at a 45° angle), aligns the wiper blade in the slot, and pulls the applicator across the wiper blade.

Applicators to coat other rubber materials can be formed or cut to fit the shape of the particular rubber material to be coated. While foam applicators are preferred for windshield wipers, any material or method which permits application of the composition may be used. For example, the composition may be applied to a rubber material by coating, dipping, brushing, or using rollers to apply the composition onto a rubber material. The composition may also be sprayed onto a rubber material, e.g., from a spray gun or an aerosol can with a propellant.

The composition can be applied to the rubber material during manufacture, prior to placing the material in use, or even after the material has been in use for some time. The lubricating and/or preserving effect of the composition does not require application of the material prior to use and may advantageously be more beneficial if applied to a rubber material which has already experienced some wear.

As discussed above, the composition may be used to lubricate and/or protect a rubber material, particularly those in contact with a smooth surface. Smooth surfaces include, for example, glass, metal, wood, plastics, coated or painted surfaces, and surfaces having a substantially smooth finish.

The composition of the invention can be made by means known in the art such as by simple mixing of the components in any order at room temperature. A preferred method begins by charging a mixing tank with isopropyl alcohol and, while stirring, adding the graphite followed by titanate ester and any other components. When a component, such as the UV absorber Tinuvin ®, comes in the form of a solid, that solid component may be added directly to the stirred mixture or dispersed or dissolved in an appropriate solvent, preferably isopropyl alcohol, before adding it to the mixture. Once all the components have been added, stirring may be continued to ensure complete dispersement or dissolution of the components. For a one gallon batch size, stirring generally continues approximately fifteen minutes after adding all the components. The length of time the stirring is continued is not critical but can be determined by one of ordinary skill.

The following examples illustrate the invention.

EXAMPLE 1:

To prepare a composition to lubricate or preserve rubber according to the invention, the following components were formulated by mixing at room temperature according to the preferred method described above and in the proportions set out in Table 1.

TABLE 1

| Component | | Amount |
|---|---|---|
| isopropyl alcohol | — | 80 oz. |
| graphite | Dag 154 | 40 oz. |
| fluorotelomer | Vydax ® | 7 oz. |
| butyl titanate | Tyzor ® | 1 oz. |

TABLE 1-continued

| Component | | Amount |
| --- | --- | --- |
| ester | | |
| | | 128 oz. = 1 gal. |

EXAMPLE 2:

To prepare a composition to lubricate or preserve rubber according to a second embodiment of the invention, the following components were formulated by the preferred method above and in the proportions set out in Table 2.

TABLE 2

| Component | | Amount |
| --- | --- | --- |
| isopropyl alcohol | — | 87 oz. |
| graphite | Dag 154 | 40 oz. |
| butyl titanate ester | Tyzor ® | 1 oz. |
| | | 128 oz. = 1 gal. |
| UV absorber | Tinuvin ® | 15 g |

EXAMPLE 3:

To prepare a composition to lubricate or preserve rubber according to a third embodiment of the invention, the following components were formulated by the preferred method above and in the proportions set out in Table 3.

TABLE 3

| Component | | Amount |
| --- | --- | --- |
| isopropyl alcohol | — | 80 oz. |
| graphite | Dag 154 | 40 oz. |
| butyl titanate ester | Tyzor ® | 1 oz. |
| fluorotelomer | Vydax ® | 7 oz. |
| | | 128 oz. = 1 gal. |
| UV absorber | Tinuvin ® | 15 g |

Each of the compositions in Examples 1–3 was tested on windshield wiper blades at various moisture levels ranging from completely dry to light moisture conditions and to completely wet. In the tests the windshield wiper blade was coated with the composition and then contacted with a windshield simulating the normal windshield wiper action of a car under various moisture levels. In each test, the squeaking, or skipping of the wiper blade was significantly reduced or eliminated.

It will be apparent to those skilled in the art that various modifications and variations can be made in the composition and method of the present invention without departing from the spirit or scope of the invention. Thus, it is intended that the present invention cover the modifications and variations of this invention provided they come within the scope of the appended claims and their equivalents.

I claim:

1. A composition to lubricate and preserve rubber comprising, by weight, 5–10% graphite, 0.5–10% of a butyl titanate ester, and the balance, isopropyl alcohol.

2. A composition of claim 1 comprising 6–8% graphite, and 0.7–3% of a butyl titanate ester.

3. A composition of claim 2 comprising about 7% of graphite, and about 1% of a butyl titanate ester.

4. A composition of claim 2 wherein the graphite is colloidal graphite.

5. A composition to lubricate or preserve rubber comprising, by weight, 5–10% graphite, 0.5–5% of a fluorocarbon polymer, 0.5–10% of a butyl titanate ester and the balance isopropyl alcohol.

6. A composition of claim 5 comprising 6–8% graphite, 1–2.5% of a fluorocarbon polymer and 1–2.5% of a butyl titanate ester.

7. A composition of claim 6 comprising about 7% of graphite, about 2% of a fluorocarbon polymer, and about 1% of a butyl titanate ester.

8. A composition of claim 6 wherein the graphite is colloidal graphite and the fluorocarbon polymer is a fluorotelomer.

9. A composition of claim 8 wherein the graphite is colloidal graphite in a resin binder, the butyl titanate ester is tetrabutyl titanate, tributyl isopropyl titanate or a mixture thereof, and the fluorotelomer is omega-hydro-alpha-(methylcyclohexyl)-polytetrafluoroethylene, alpha-chloro-omega-(2,2-dichlorotrifluoroethyl)-polytetrafluoroethylene or a mixture thereof.

10. A composition to lubricate or preserve rubber comprising, by weight, 5–10% graphite, 0.02–5% of a UV stabilizer, 0.5–10% of a butyl titanate ester and the balance isopropyl alcohol.

11. A composition of claim 10 comprising 6–8% graphite, 0.5–1.5% of a UV stabilizer, and 0.7–3% of a butyl titanate ester.

12. A composition of claim 11 comprising about 7% of graphite, about 0.5% of a UV stabilizer, and about 1% of a butyl titanate ester.

13. A composition of claim 11 wherein the graphite is colloidal graphite and the UV stabilizer is a benzophenone, a benzotriazole, substituted acrylonitrile, or a phenol-nickel complex.

14. A composition of claim 13 wherein the graphite is colloidal graphite in a resin binder, the butyl titanate ester is tetrabutyl titanate, tributyl isopropyl titanate or a mixture thereof, and the UV stabilizer is a benzotriazole.

15. A composition of claim 13 further comprising 0.5–5% of a fluorocarbon polymer.

16. A composition of claim 14 further comprising 1–2.5% of a fluorocarbon polymer which is a fluorotelomer selected from omega-hydro-alpha-(methylcyclohexyl)-polytetrafluoroethylene, alpha-chloro-omega-(2,2-dichlorotrifluoroethyl)-polytetrafluoroethylene or a mixture thereof.

17. A method for lubricating or preserving a rubber material comprising the steps of applying a composition of claim 16 to a rubber material and allowing the composition to adhere to the rubber material.

18. A method for lubricating or preserving a rubber material comprising the steps of applying a composition of claim 13 to a rubber material and allowing the composition to adhere to the rubber material.

19. The method of claim 18 wherein the rubber material is a windshield wiper blade and the composition is adhered to the windshield wiper blade by drying.

20. A method for lubricating or preserving a rubber material comprising the steps of applying a composition of claim 10 to a rubber material and allowing the composition to adhere to the rubber material.

21. A method for lubricating or preserving a rubber material comprising the steps of applying a composition of claim 8 to a rubber material and allowing the composition to adhere to the rubber material.

22. The method of claim 21 wherein the rubber material is a windshield wiper blade and the composition is adhered to the windshield wiper blade by drying.

23. A method for lubricating or preserving a rubber material comprising the steps of applying a composition of claim 5 to a rubber material and allowing the composition to adhere to the rubber material.

24. A method for lubricating or preserving a rubber material comprising the steps of applying a composition of claim 4 to a rubber material and allowing the composition to adhere to the rubber material.

25. The method of claim 24 wherein the rubber material is a windshield wiper blade and the composition is adhered to the windshield wiper blade by drying.

26. A method for lubricating or preserving a rubber material comprising the steps of applying a composition of claim i to a rubber material and allowing the composition to adhere to the rubber material.

* * * * *

UNITED STATES PATENT AND TRADEMARK OFFICE
CERTIFICATE OF CORRECTION

PATENT NO. : 5,447,645
DATED : September 5, 1995
INVENTOR(S) : Todd C. Marshall

It is certified that error appears in the above-indentified patent and that said Letters Patent is hereby corrected as shown below:

Claim 26, column 8, line 6, "claim i" should read --claim 1--.

Signed and Sealed this

Thirty-first Day of October 1995

Attest:

BRUCE LEHMAN

*Attesting Officer*    Commissioner of Patents and Trademarks